United States Patent [19]
Yoshida

[11] Patent Number: 5,408,498
[45] Date of Patent: Apr. 18, 1995

[54] SERIAL-SIGNAL TRANSMISSION APPARATUS

[75] Inventor: Yukihiro Yoshida, Ikoma, Japan

[73] Assignee: Sharp Kabushiki Kaisha, Osaka, Japan

[21] Appl. No.: 886,390

[22] Filed: May 21, 1992

[30] Foreign Application Priority Data

Jul. 3, 1991 [JP] Japan ................... 3-163100

[51] Int. Cl.$^6$ ............... H04L 25/34; H04L 25/49
[52] U.S. Cl. .................. 375/286; 341/56; 341/57
[58] Field of Search ............ 375/17; 341/56, 57, 341/55; 377/75, 76

[56] References Cited

U.S. PATENT DOCUMENTS

| | | | |
|---|---|---|---|
| 3,400,369 | 1/1963 | Cooper | 375/17 |
| 3,510,585 | 5/1970 | Stone | 375/17 |
| 3,560,856 | 2/1971 | Kaneko | 341/56 |
| 3,798,544 | 3/1974 | Norman | 375/17 |
| 3,988,676 | 10/1976 | Whang | 341/57 |
| 4,087,642 | 5/1978 | Jessop et al. | 375/17 |
| 4,092,595 | 5/1978 | Weir et al. | 375/17 |
| 4,528,550 | 7/1985 | Graves et al. | 375/17 |
| 4,618,941 | 10/1986 | Linder et al. | 375/17 |

Primary Examiner—Stephen Chin
Assistant Examiner—Tesfaldet Bocure
Attorney, Agent, or Firm—Birch, Stewart, Kolasch & Birch

[57] ABSTRACT

An apparatus for transmitting information with a reduced number of bits without decreasing a transmission speed of a serial-signal and without omitting any information in the serial-signal includes an encoding unit (20) for encoding a serial-signal with binary-value into a serial-signal with quaternary-value and for outputting the encoded serial-signal with the quaternary-value, and a decoding unit (30) for receiving the encoded serial-signal with the quaternary-value output from the encoding unit (20) and for decoding the received serial-signal with the quaternary-value into the serial-signal with the binary-value.

22 Claims, 9 Drawing Sheets

5,408,498

SERIAL-SIGNAL TRANSMISSION APPARATUS

BACKGROUND OF THE INVENTION

1. Field of the Invention

This invention relates to a serial-signal transmission apparatus, more particularly, the serial-signal transmission apparatus which is capable of transmitting information without decreasing the data transmission speed and/or without omitting any information in the serial-signal.

2. Description of the Related Art

In general, there has been a growing demand of a device, such as a large scale integrated circuit (LSI), with increasing speed for processing a serial signal and for transmitting a serial signal at high speed.

The inventors of the present invention know that there is data compression technology in facsimile transmission or the like and encoding technology of bit information in error correction circuitry (ECC), as means for reducing the number of bits in transmission of information represented by a serial signal.

However, in the above-mentioned existing art, there is a problem of unnecessarily sending redundant information in the serial signal. Therefore, it is impossible to transmit the complete information.

In the above-mentioned means for reducing the number of bits, there is a problem that the data transmission speed is too slow.

SUMMARY OF THE INVENTION

It is therefore an object of the present invention to provide a serial-signal transmission apparatus for transmitting information with the number of bits reduced without decreasing the data transmission speed and without omitting any information in the serial-signal.

The object of the present invention can be achieved by an apparatus for transmitting information with a reduced number of bits without decreasing transmission speeds of serial-signal and without omitting any information in the serial-signal, includes an encoding unit for encoding the serial-signal with binary-value into the serial-signal with predetermined-value and for outputting the encoded serial-signal with the predetermined value, a decoding unit for receiving the encoded serial-signal with the predetermined value output from the encoding unit and for decoding the received serial-signal with the predetermined value into the serial-signal with the binary-value.

Preferably, the encoding unit includes a binary-value/predetermined-value conversion circuit which converts the serial-signal with the binary-value into the serial-signal with the predetermined-value.

More preferably, the encoding unit further includes a shift register for sequentially outputting the serial-signal with the binary-value to the binary-value/predetermined-value conversion circuit.

The encoding unit further includes a timing generator for generating a time signal and a control signal used to control the serial signal transmitted.

The predetermined-value is preferably a n-value, with the n representing an integer equal to and greater than 3.

The predetermined-value is a quaternary-value, and the binary-value/predetermined-value conversion circuit is a binary-value/quaternary-value conversion circuit which converts a serial-signal with the binary-value into a serial-signal with a quaternary-value in accordance with a predetermined relation, preferably.

Preferably, the decoding unit includes a predetermined-value/binary-value conversion circuit which converts the serial-signal with the predetermined-value into the serial-signal with the binary-value.

More preferably, the decoding unit further includes a delay circuit for delaying the serial-signal with the binary-value output from the predetermined-value/binary-value conversion circuit by one bit.

The decoding unit further includes a binary-value OR circuit for outputting a logical OR between a signal output from the predetermined-value/binary-value conversion circuit and a signal output from the delay circuit, preferably.

The predetermined-value is a quaternary-value, and the predetermined-value/binary-value conversion circuit is a quaternary-value/binary-value conversion circuit which converts a quaternary-value signal into binary-value signal in accordance with a predetermined relation, preferably.

The encoding unit preferably includes a first shift register for supplying a serial-signal with a binary-value and a signal which leads the serial-signal by a predetermined bit to the binary-value/quaternary-value conversion circuit.

The encoding unit further includes a predetermined-bit delay circuit for delaying a signal with a value of the predetermined-bit, and a second shift register for suppling a serial-signal with a binary-value to the binary-value/quaternary-value conversion circuit through the predetermined-bit delay circuit, preferably.

The second shift register is capable of providing a serial-signal to the binary-value/quaternary-value conversion circuit 123 directly without passing through the delay circuit, preferably.

Preferably, the encoding means further includes a timing generator for supplying time signals and a control signal.

The binary-value/quaternary-value conversion circuit is preferably capable of converting each of the signals into a quaternary-value signal in accordance with the time signals and the control signal supplied by the timing generator.

The decoding unit further includes a first predetermined-bit delay circuit for delaying a signal with a value of the predetermined-bit, and a first binary-value OR circuit which is capable of outputting a logical OR between a signal supplied from the quaternary-value/binary-value conversion circuit and a signal supplied from the first predetermined-bit delay circuit, preferably.

The decoding unit further preferably includes a second predetermined-bit delay circuit for delaying a signal with a value of the predetermined-bit, and a second binary-value OR circuit which is capable of outputting a logical OR between a signal supplied from the quaternary-value/binary-value conversion circuit and a signal supplied from the second predetermined-bit delay circuit.

In operation, the serial-signal transmission apparatus according to the present invention, a binary-value serial signal is converted into an n-value serial-signal. For example, when a binary-value serial-signal is converted into a quaternary-value serial-signal (n=4), the bit length is reduced to a half, therefore, a margin in the speed of signal transmission is produced so that the stability of signal processing is improved.

Further objects and advantages of the present invention will be apparent from the following description of the preferred embodiments (embodiment) of the invention as illustrated in the accompanying drawings.

DESCRIPTION OF THE PREFERRED EMBODIMENTS

Referring to the accompanying drawings, an embodiment of the serial-signal transmission apparatus according to the present invention will be described in details.

Before describing an embodiment of the present invention, a multi-valued logic will be described in order to provide a better understanding of the serial-signal transmission apparatus according to the present invention.

Variables $x_k$ ($k=1, 2, 3, \ldots$) of a multi-valued logic can be defined as follows.

$$X_k = \bigvee_{M=0}^{N-1} \frac{M}{N-1} \left( X_k \equiv \frac{M}{N-1} \right)$$

$$\overline{X_k} = \bigvee_{M=0}^{N-1} \left( 1 - \frac{M}{N-1} \right) \left( X_k \equiv \frac{M}{N-1} \right)$$

where the symbol V denotes the logical OR, and $(A \equiv B)$ denotes an operation which makes the value in parentheses 1 in case that A equals B, or 0 in case that A differs from B, M is a variable ranging from $M=0$ to $M=N-1$, with N representing a multi-value number.

When a quaternary-valued logic is used (N=4), $x_k$ and the negation of $x_k$ are represented as below.

$$X_k = \frac{1}{3}\left(X_k \equiv \frac{1}{3}\right) + \frac{2}{3}\left(X_k \equiv \frac{2}{3}\right) + (X_k \equiv 1)$$

$$\overline{X_k} = (X_k \equiv 0) + \frac{2}{3}\left(X_k \equiv \frac{1}{3}\right) + \frac{1}{3}\left(X_k \equiv \frac{2}{3}\right)$$

In multi-valued logic, the following relation always holds and can be used for converting a binary-value number into a quaternary-value number or for converting a quaternary-value number into a binary-value number.

$$\bigvee_{M=0}^{N-1}\left(X_k \equiv \frac{M}{N-1}\right) = 1$$

then, when $I \neq J$, $$\left(X_k \equiv \frac{I}{N-1}\right)\left(X_k \equiv \frac{J}{N-1}\right) = 0$$

and when $I = J$, $$\left(X_k \equiv \frac{I}{N-1}\right)\left(X_k \equiv \frac{J}{N-1}\right) = \left(X_k \equiv \frac{I}{N-1}\right)$$

$$\left(X_k \equiv \frac{I}{N-1}\right) + \left(X_k \equiv \frac{J}{N-1}\right) = \left(X_k \equiv \frac{I}{N-1}\right)$$

Figure 1:
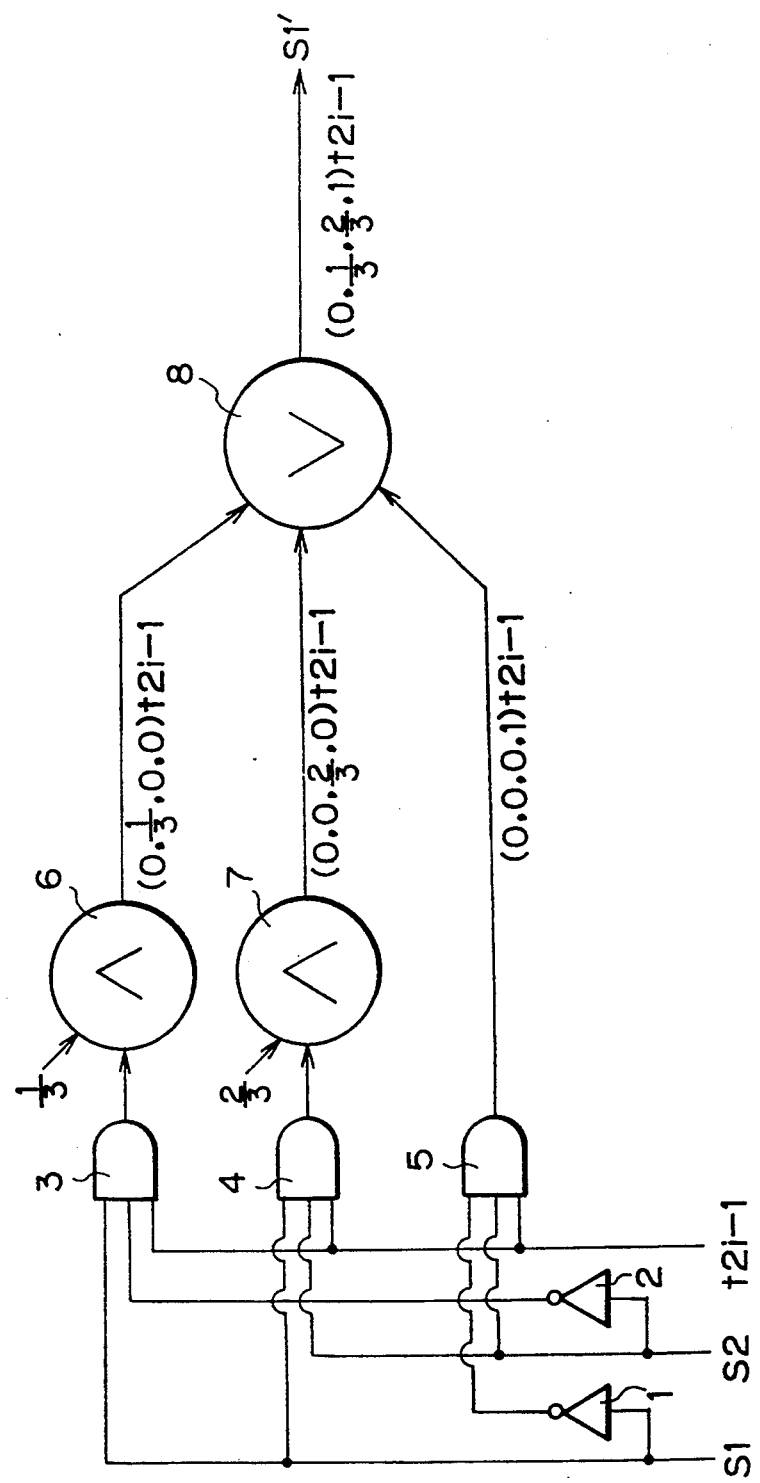
FIG. 1 shows a binary-value/quaternary-value conversion circuit according to the present invention.

FIG. 1 shows a binary-value/quaternary-value conversion circuit of a encoding unit according to the present invention.

The binary-value/quaternary-value conversion circuit shown in FIG. 1 converts a binary-value 64-bits serial-signal into a quaternary-value 32-bits serial-signal.

The binary-value/quaternary-value conversion circuit of FIG. 1 includes inverters 1,2, binary-value AND circuits 3–5, quaternary-value AND circuits 6, 7 and a quaternary-value OR circuit 8.

The quaternary-value AND circuit 6 receives output from the binary-value AND circuit 3 and a value of $\frac{1}{3}$. The quaternary-value AND circuit 7 receives an output from the binary-value AND circuit 4 and a value of $\frac{2}{3}$. The quaternary-value OR circuit 8 receives outputs of the quaternary-value AND circuits 6,7 and an output of the binary-value AND circuit 5.

The symbol S1 is a 64-bits serial-signal, while S2 is a signal leads S1 by one bit. Those signals S1,S2 are input sequentially to the encoding unit in synchronization with time signals t0, t1, ..., t63.

In FIG. 1, the symbol V denotes a logical OR, and the symbol Λ denotes a logical AND.

The circuit of FIG. 1 converts a binary-value serial-signal S1,S2 into a quaternary-value serial-signal S1' according to a logical expression shown below.

$$S1' = \left(\frac{1}{3} S1\, \overline{S2} + \frac{2}{3}\, S1\, S2 + \overline{S1}S2\right)t2i - 1$$

where, $i = 1, 2, \ldots, 31, 32$, and t2i representing a time at which the binary-value signals need not be coded.

Table 1 shows the relation between binary-value signals S1,S2 and a quaternary-value signal S1'.

TABLE 1

| S1 | S2 | S1' |
|----|----|-----|
| 0 | 0 | 0 |
| 1 | 0 | $\frac{1}{3}$ |
| 1 | 1 | $\frac{2}{3}$ |

TABLE 1-continued

| S1 | S2 | S1' |
|----|----|-----|
| 0  | 1  | 1   |

Figure 2:
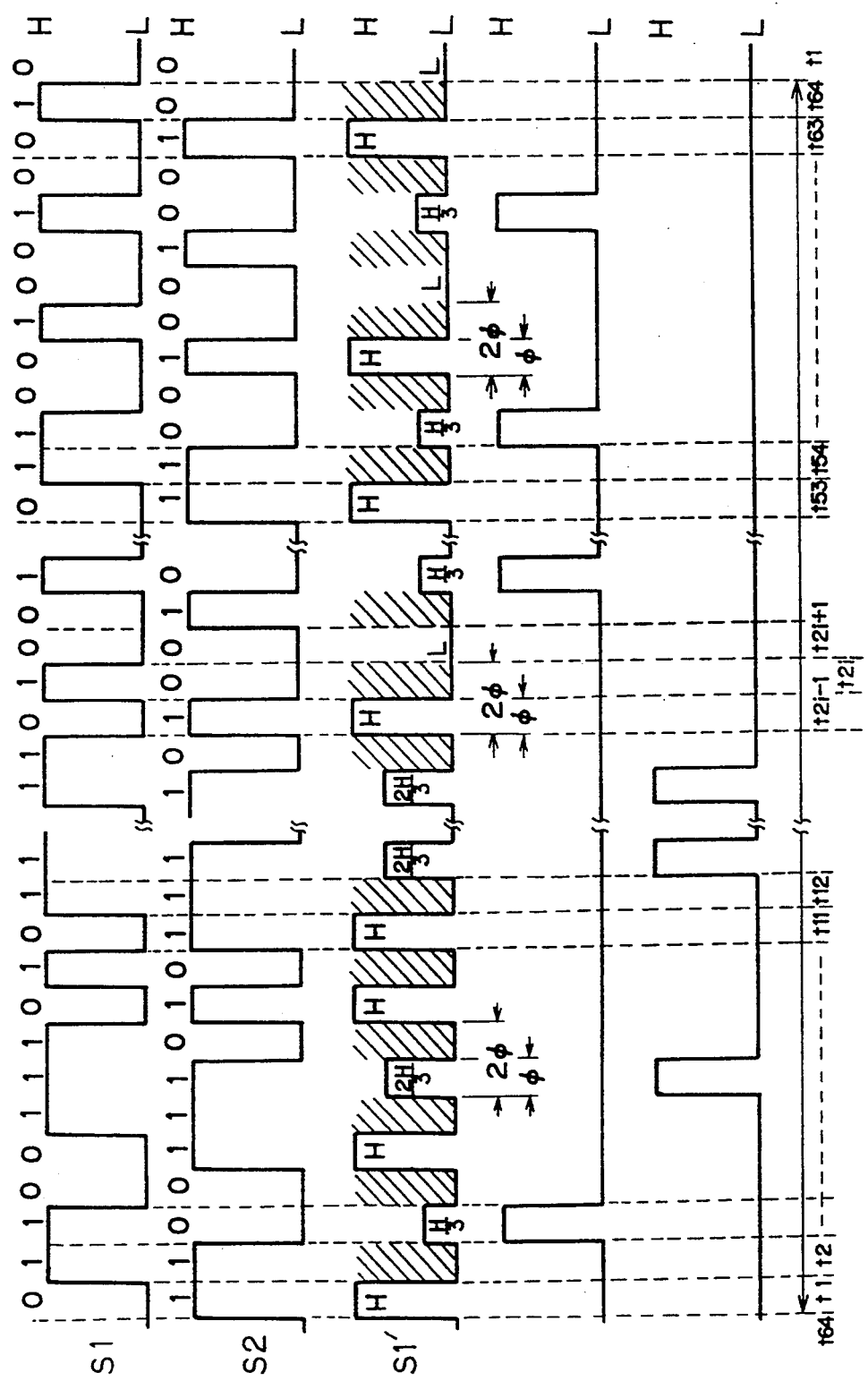
FIG. 2 shows a signal waveform for explaining the operation of the binary-value/quaternary-value conversion circuit of FIG. 1.

FIG. 2 shows an example of waveforms of the binary-value signals S1,S2 and the quaternary-value signal S1'.

The hatched areas in FIG. 2 indicate the time t2i at which the binary-value signals need not be coded.

The symbol $\phi$ indicates the periods of the clock signal. From FIG. 2, it is apparent that the a serial signal may be transmitted in virtual clock signal periods in case that the encoding unit is used. By so doing, the bit length of the a serial-signal can be shortened to a half comparing with a bit length of the serial-signals without using the encoding unit.

Figure 3:
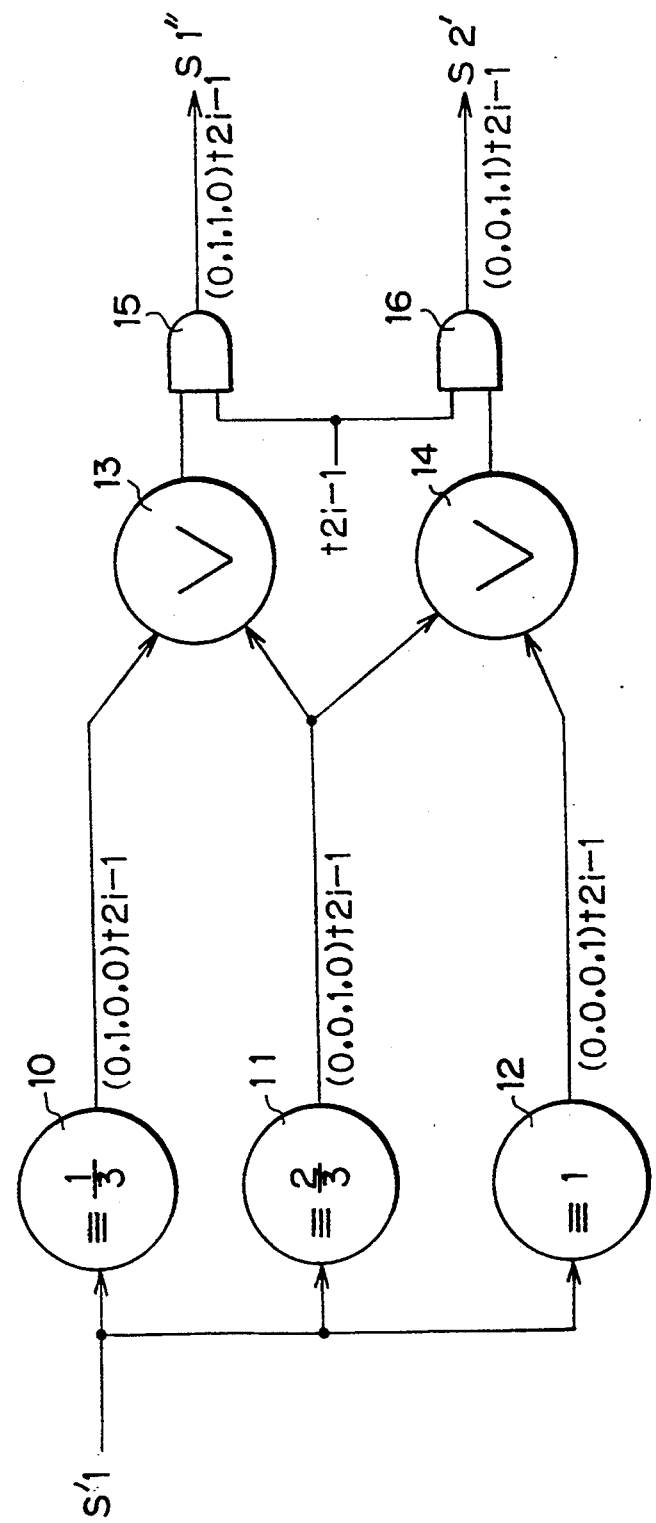
FIG. 3 shows a quaternary-value/binary-value conversion circuit according to the present invention.

FIG. 3 shows a quaternary-value/binary-value conversion circuit of the decoding unit according to the present invention.

This quaternary-value/binary-value conversion circuit restores a quaternary-value 32-bits serial-signal into a binary-value 64-bits serial-signal.

As shown in FIG. 3, the quaternary-value/binary-value conversion circuit includes equal-value circuits 10 to 12 which output a value of 1 at a time when they receive $\frac{1}{3}$, $\frac{2}{3}$, and 1, respectively, or output a value of 0 at a time when they receive value other than those value.

The quaternary-value/binary-value conversion circuit further includes a binary-value OR circuit 13 which receives the outputs of the equal-value circuits 10 and 11, a binary-value OR circuit 14 which receives the outputs of the equal-value circuits 11 and 12, a binary-value AND circuit 15 which outputs a logical AND between an output of the binary-value OR circuit 13 and a signal t2i−1, and a binary-value AND circuit 16 which outputs a logical AND between an output of the binary-value OR circuit 14 and a signal t2i−1.

This logic circuit converts a quaternary-value signal S1' into binary-value signal S1'' and S2' according to the logical expression that follows.

$$S1'' = \left\{ \left(S1' = \frac{1}{3}\right) + \left(S1' = \frac{2}{3}\right) \right\} t2i - 1$$

$$S2' = \left\{ \left(S1' = \frac{2}{3}\right) + (S1' = 1) \right\} t2i - 1$$

Table 2 shows the relation between a quaternary-value signal S1', and binary-value signals S1'',S2'.

TABLE 2

| S1' | S1'' | S2' |
|-----|------|-----|
| 0   | 0    | 0   |
| $\frac{1}{3}$ | 1 | 0 |
| $\frac{2}{3}$ | 1 | 1 |
| 1   | 0    | 1   |

The signal transmission between the encoding unit and the decoding unit having the binary-value/quaternary-value conversion circuit and the quaternary-value/binary-value conversion circuit respectively will be described with reference to FIG. 4.

Figure 4:
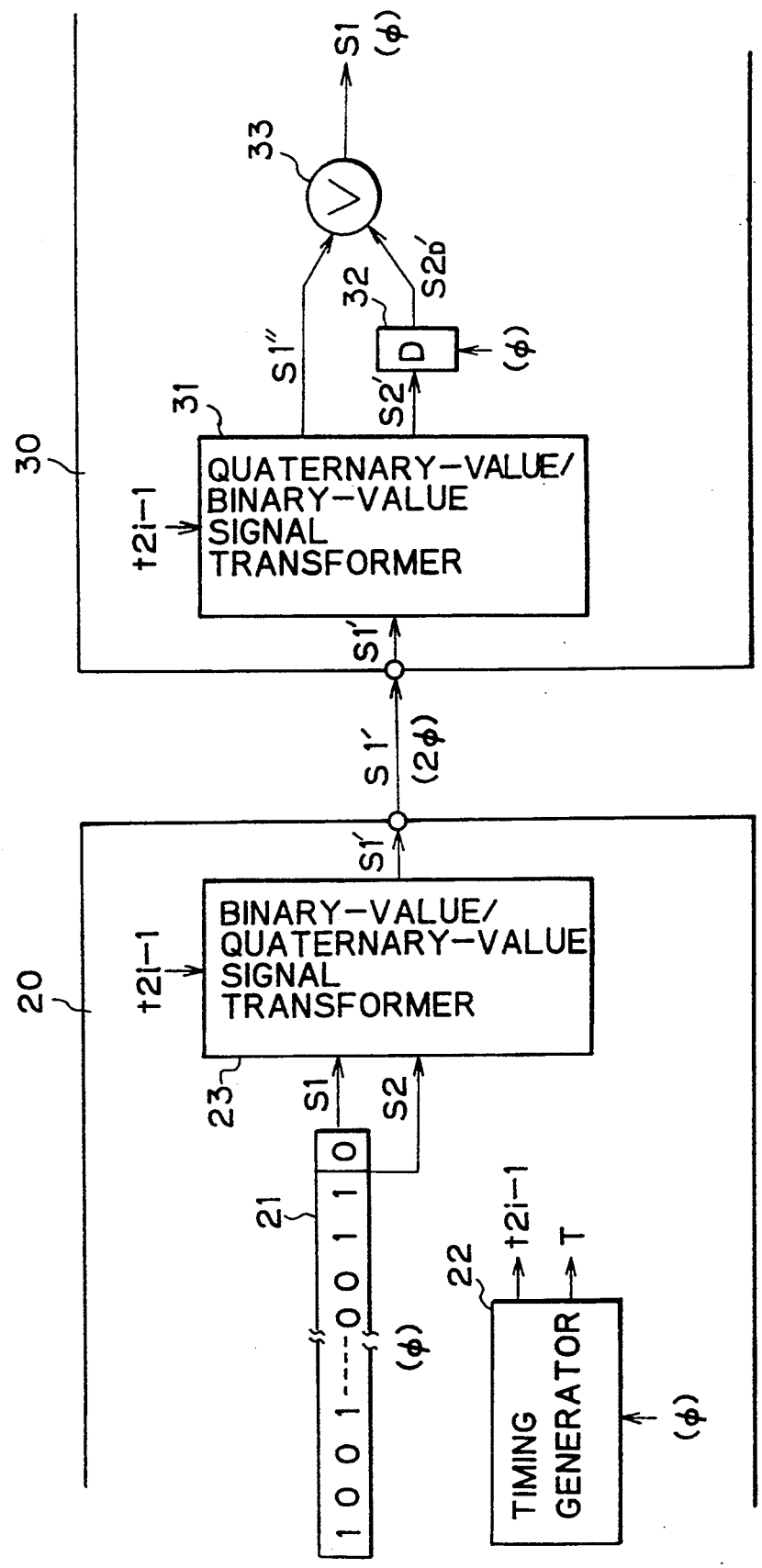
FIG. 4 shows a schematic view of the first embodiment of the serial-signal transmission apparatus according to the present invention.

As shown in FIG. 4, the encoding unit 20 includes a shift register 21 for sequentially outputting binary-value 64-bit serial-signals denoted by S1,S2 to the binary-value/quaternary-value conversion circuit 23, and a timing generator 22 for generating a time signal t2i−1 and a control signal T which are transmitted with a word unit of 64-bit from a clock signal $\phi$.

The decoding unit 30 shown in FIG. 4 includes a quaternary-value/binary-value conversion circuit 31, a delay circuit 32 for delaying by one bit the binary-value signal output by the quaternary-value/binary-value conversion circuit 31, and a binary-value OR circuit 33 for outputting a logical OR between the signal S1'' output from the quaternary-value/binary-value conversion circuit 31, and a signal S2$_D$' output from the delay circuit 32, namely, a binary-value 64-bit serial-signal S1.

Figure 5:
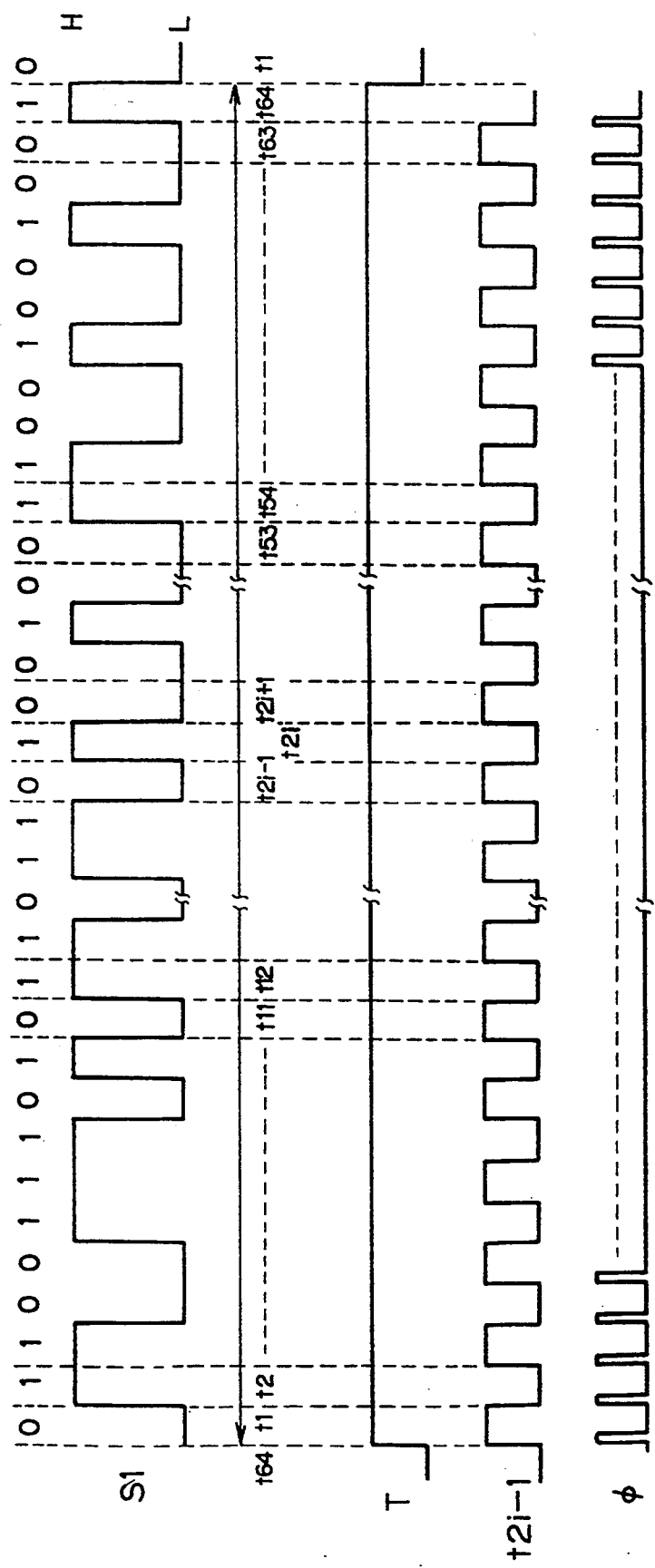
FIG. 5 shows a signal waveform in signal transmission of the serial signal transmission apparatus of FIG. 4.

FIG. 5 shows an example of waveforms of the signal S1 restored by the decoding unit 30, the control signal T, the time signal t2i−1 and the clock signal $\phi$.

Figure 6:
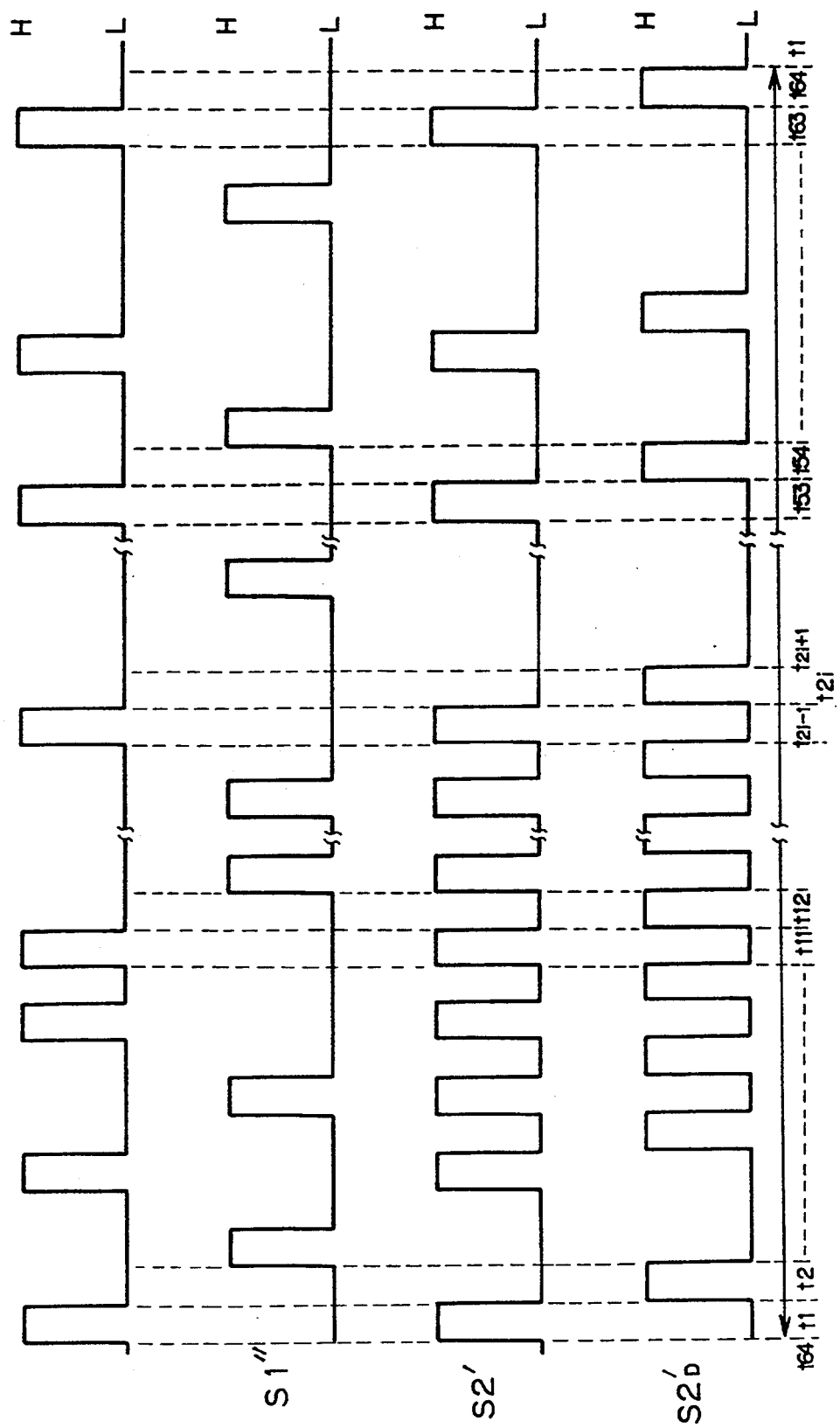
FIG. 6 shows a signal waveform in signal transmission of the serial signal transmission apparatus of FIG. 4.

FIG. 6 shows an example of waveforms of the binary-value serial-signals S1'',S2' and the signal S2$_D$'.

In the above-mentioned signal transmission, the signals are transmitted not at time t2i but only at time t2i−1, by which the signal transmission speed is given a leeway, so that the stability of signal processing is ensured.

Figure 7:
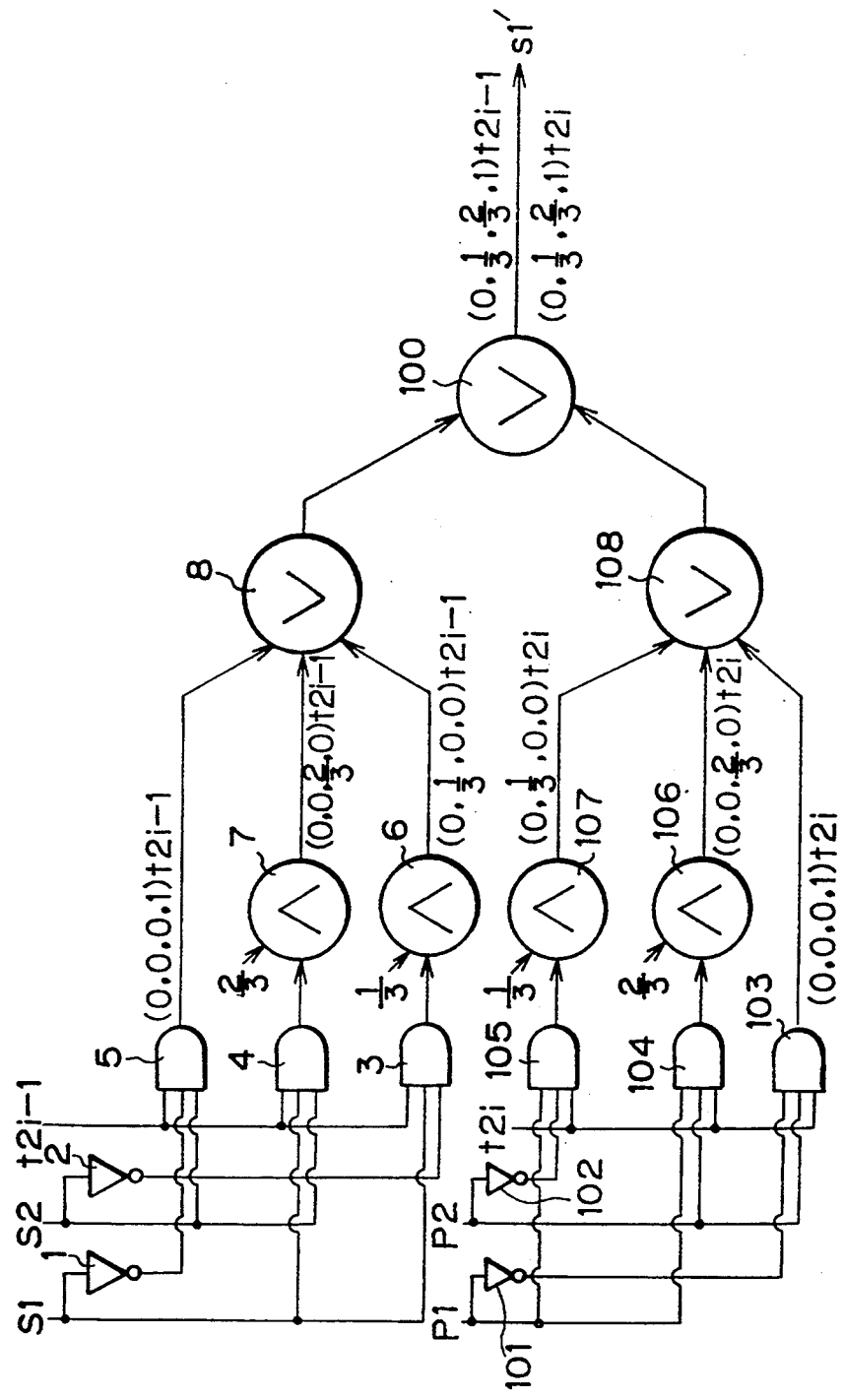
FIG. 7 shows another binary-value/quaternary-value conversion circuit according to the present invention.

However, the time t2i may be used to transmit another binary-value 64-bits serial-signal P1 as shown in FIG. 7. In this case, a binary-value/quaternary-value conversion circuit is formed by adding another logic circuit of the same configuration as the binary-value/quaternary-value conversion circuit in FIG. 1.

The logic circuit is added as shown in FIG. 7 which comprises binary-value inverters 101,102, binary-value AND circuits 103–105, quaternary-value AND circuits 106,107, and a quaternary-value OR circuit 108.

A logical OR of outputs of those two logic circuits is output as a signal S1' from the logical OR circuit 100.

In the above case, the signal S1' represents a quaternary-value signal converted from the signal S1 at time t2i−1 and a quaternary-value signal converted from the signal P1 at time t2i. This logic circuit converts binary-value a serial signal S1, S2 and P1, P2 into a quaternary-value serial-signal S1'.

$$S1' = \left(\frac{1}{3} S1\overline{S2} + \frac{2}{3} S1S2 + \overline{S1}S2\right) t2i - 1 +$$

$$\left(\frac{1}{3} P1\overline{P2} + \frac{2}{3} P1P2 + \overline{P1}P2\right) t2i$$

Table 3 shows the relation between binary-value serial-signals S1, S2, P1, P2 and a quaternary-value serial-signal S1'.

TABLE 3

| t2i − 1 | | t2i | | S1' | |
|---|---|---|---|---|---|
| S1 | S2 | P1 | P2 | t2i − 1 | t2i |
| 0 | 0 | 0 | 0 | 0 | 0 |
| 1 | 0 | 1 | 0 | $\frac{1}{3}$ | $\frac{1}{3}$ |
| 1 | 1 | 1 | 1 | $\frac{2}{3}$ | $\frac{2}{3}$ |
| 0 | 1 | 0 | 1 | 1 | 1 |

Figure 8:
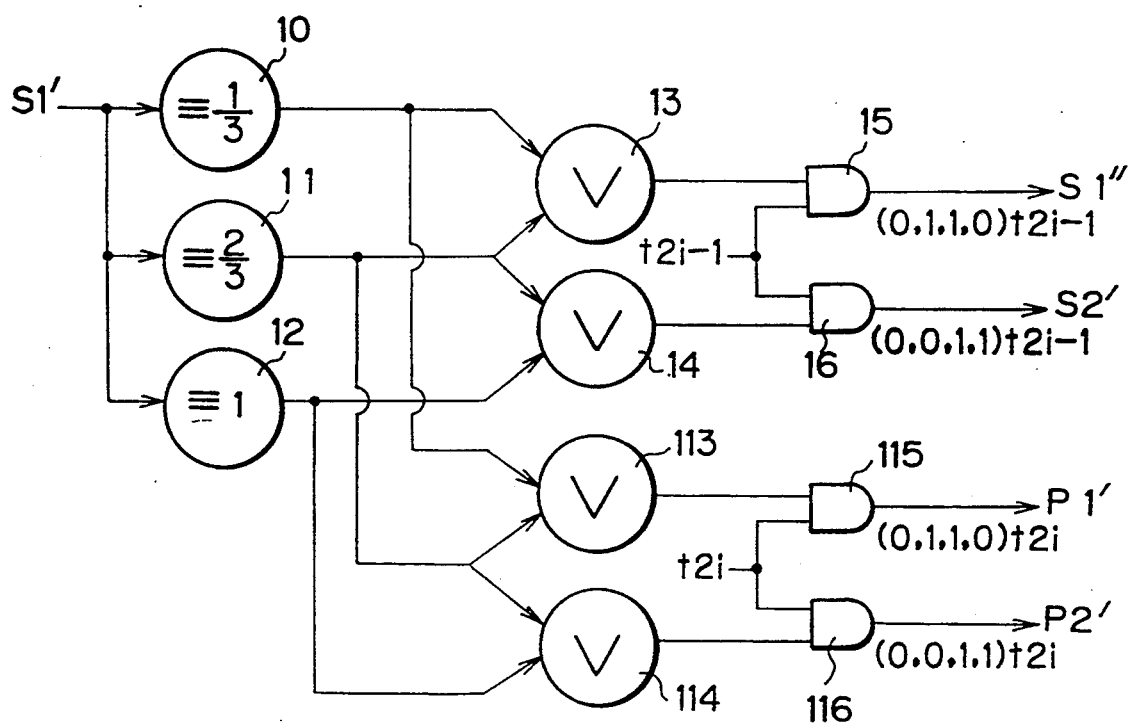
FIG. 8 shows another quaternary-value/binary-value conversion circuit according to the present invention.

FIG. 8 shows a quaternary-value/binary-value conversion circuit for restoring a quaternary-value signal produced by the above-mentioned binary-value/quaternary-value conversion circuit into a binary-value signal.

As shown in FIG. 8, the quaternary-value/binary-value conversion circuit is formed by adding the logic circuit of FIG. 3 with a binary-value OR circuit 113 for outputting a logical OR of outputs of the equal-value circuits 10,11, a binary-value OR circuit 114 for outputting a logical OR of outputs of the equal-value circuits 11,12, an AND circuit for outputting a logical AND between an output of the OR circuit 113 and a signal t2$i$, and an AND circuit 116 for outputting a logical AND between an output of the OR circuit 114 and the signal t2$i$. This logic circuit converts a quaternary-value signal S1' into binary-value signals S1'', S2', P1' and P2' according to logical expressions that follow.

$$S1'' = \left\{ \left( S1' = \frac{1}{3} \right) + \left( S1' = \frac{2}{3} \right) \right\} t2i - 1$$

$$S2' = \left\{ \left( S1' = \frac{2}{3} \right) + (S1' = 1) \right\} t2i - 1$$

$$P1' = \left\{ \left( S1' = \frac{1}{3} \right) + \left( S1' = \frac{2}{3} \right) \right\} t2i$$

$$P2' = \left\{ \left( S1' = \frac{2}{3} \right) + (S1' = 1) \right\} t2i$$

Table 4 shows the relation between a quaternary-value signal S1' and binary-value signals S1'', S2', P1', P2'.

TABLE 4

| S1' | | S1'' | S2' | P1' | P2' |
|---|---|---|---|---|---|
| t2i − 1 | t2i | t2i − 1 | | t2i | |
| 0 | 0 | 0 | 0 | 0 | 0 |
| 1/3 | 1/3 | 1 | 0 | 1 | 0 |
| 2/3 | 2/3 | 1 | 1 | 1 | 1 |
| 1 | 1 | 0 | 1 | 0 | 1 |

Figure 9:
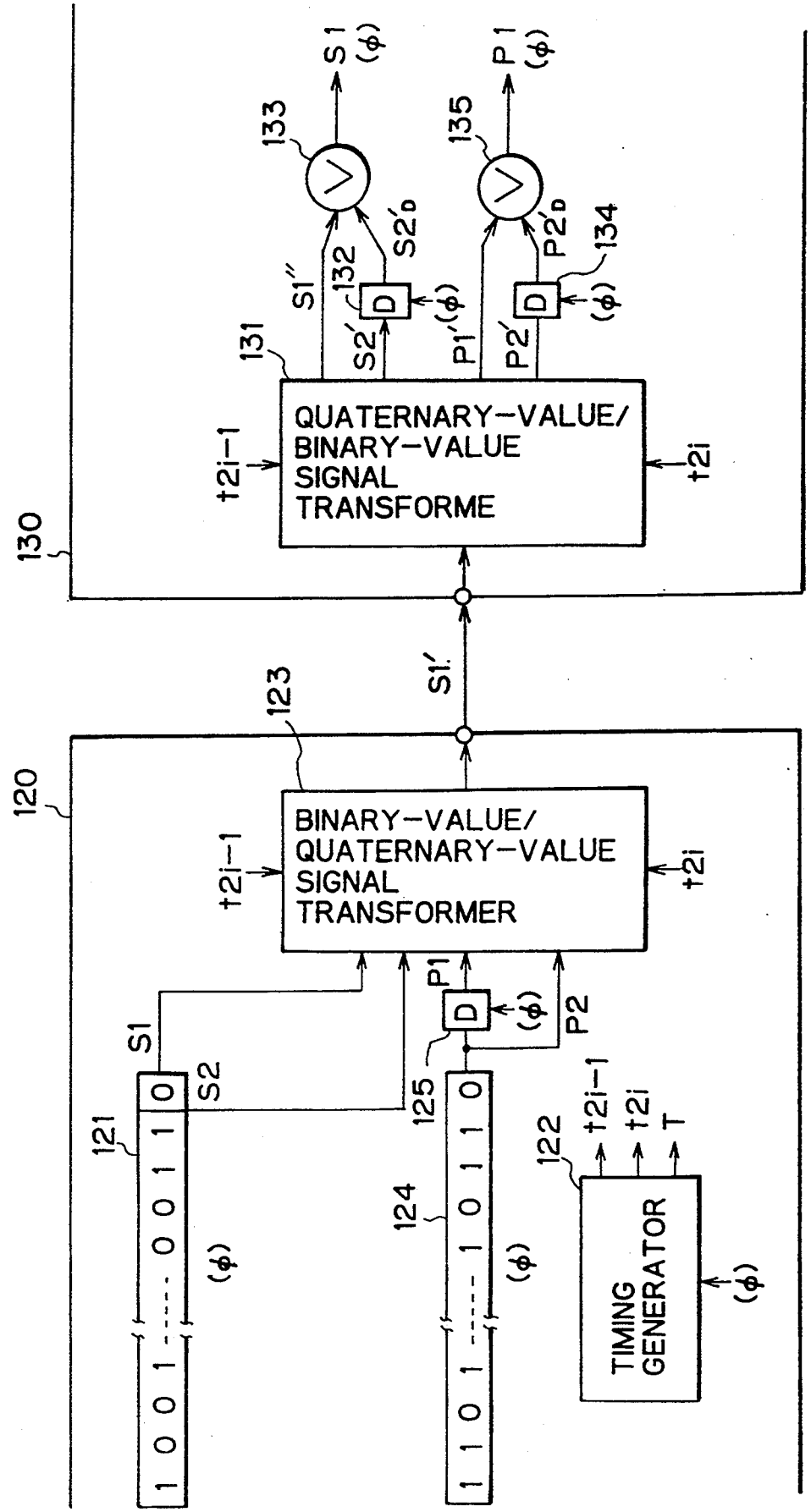
FIG. 9 shows a schematic view of the second embodiment of the serial signal transmission apparatus according to the present invention.

Referring to FIG. 9, a second embodiment of the serial-signal transmission apparatus according to the present invention will be described.

As shown, the serial-signal transmission apparatus in FIG. 9 includes the encoding unit having the binary-value/quaternary-value conversion circuit and the decoding unit having the quaternary-value/binary-value conversion circuit, respectively, and capable of transmitting a serial signal between the encoding unit and the decoding unit.

The encoding unit 120 includes a shift register 121, a timing-generator 122, a binary-value/quaternary-value conversion circuit 123, a shift register 124 and 1-bit delay circuit 125.

The shift register 121 supplies a binary-value 64-bits serial signal S1 and a signal S2 which leads the signal S1 by one bit to the binary-value/quaternary-value conversion circuit 123.

The shift register 124 supplies a binary-value 64-bits serial-signal P1 to the binary-value/quaternary-value conversion circuit 123 through the 1-bit delay circuit 125. The shift register 124 also provides a serial-signal P2 to the binary-value/quaternary-value conversion circuit 123 directly, without passing through the delay circuit 125.

The binary-value/quaternary-value conversion circuit 123 converts the serial-signals S1, S2, P1 and P2 into a quaternary-value signal S1' by using time signals t2$i$−1 and t2$i$ and a control signal T supplied by a timing generator 122.

The decoding unit 130 converts this quaternary-value signal S1' into binary-value signals S1'', S2', P1' and P2' by unit of the quaternary-value/binary-value conversion circuit 131.

A binary-value OR circuit 133' outputs a logical OR between the signal S1'' from the quaternary-value/binary-value conversion circuit 131 and a signal S2$_D$' from the 1-bit delay circuit 132, namely, a 64-bits serial signal S1.

A binary-value OR circuit 135 outputs a logical OR between the signal P1' from the quaternary-value/binary-value conversion circuit 131 and a signal P2$_D$' from a 1-bit delay circuit 134, namely, a 64-bits serial signal P1.

The present invention can be applied to encoding and decoding the signals when reading and writing information on devices for storing a serial signal, e.g., HDD (hard disk drive) as well as communication devices handling a serial signal.

In this application, in case that a quaternary-valued logic is used, information can be stored in a hard disk as if its capacity were expanded to twice as large comparing with a capacity without using the quaternary-valued logic.

In case that the serial-signal transmission apparatus shown in FIG. 9 is used, two serial-signals S1,P1 can be transmitted simultaneously. Therefore, the information can be transmitted with increased speed as if the transmission time were shortened substantially comparing with the transmission time without using the serial-signal transmission apparatus.

Generally, in multi-valued logic, a large number of codes can be assigned. Therefore, the above-mentioned embodiments are only a few examples. In case that the codes other than those used herein are adopted, binary-value/quaternary-value conversion circuits and quaternary-value/binary-value conversion circuits can be formed to suit the adopted codes in the same way as in the above-mentioned embodiments.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for transmitting in a reduced-bit format without decreasing a transmission speed of a serial-signal and without omitting any information in said serial-signal, comprising encoding means for encoding said serial-signal with a binary-value into said serial-signal with a predetermined-value and for outputting an encoded serial-signal with said predetermined value; and decoding means for receiving said encoded serial-signal with said predetermined value output from said encoding means and for decoding said received encoded serial-signal with said predetermined value into said serial-signal with said binary-value, said decoding means including:

a predetermined-value/binary-value conversion circuit which converts said serial-signal with said predetermined-value into said serial-signal with said binary-value;

a first predetermined-bit delay circuit for delaying said serial-signal with said binary-value output from said predetermined-value/binary-value conversion circuit by a predetermined number of bits; and a first binary-value OR circuit for outputting a logical OR between said serial-signal with said binary-value and said delayed serial-signal with said binary-value.

2. An apparatus according to claim 1, wherein said encoding means includes a binary-value/predetermined-value conversion circuit which converts said serial-signal with said binary-value into said serial-signal with said predetermined-value.

3. An apparatus according to claim 2, wherein said encoding means further includes a shift register for sequentially outputting said serial-signal with said binary-value to said binary-value/predetermined-value conversion circuit.

4. An apparatus according to claim 3, wherein said encoding means further includes a timing generator for supplying a time signal and a control signal which are used to control to said binary-value/predetermined-value conversion circuit.

5. An apparatus according to claim 2, wherein said predetermined-value is an n-value, where n is an integer $\geq 3$.

6. An apparatus according to claim 5, wherein said predetermined-value is a quaternary-value, and said binary-value/predetermined-value conversion circuit is a binary-value/quaternary-value conversion circuit which converts said serial-signal with said binary-value into a serial-signal with a quaternary-value.

7. An apparatus according to claim 2, wherein said encoding means includes a first shift register for supplying said serial signal with said binary-value and a signal which leads said serial signal by a predetermined bit to said binary-value/predetermined-value conversion circuit.

8. An apparatus according to claim 7, wherein said encoding means further includes a predetermined-bit delay circuit for delaying a signal with a value of a predetermined-bit, and a second shift register for supplying a serial-signal with a binary-value to said binary-value/predetermined-value conversion circuit through said predetermined-bit delay circuit.

9. An apparatus according to claim 8, wherein said second shift register is capable of providing said serial-signal with a binary value to said binary value/predetermined-value conversion circuit directly, without passing through said predetermined-bit circuit.

10. An apparatus according to claim 8, wherein said encoding means further includes a timing generator for supplying a plurality of time signals and a control signal to said binary-value/predetermined-value conversion circuit.

11. An apparatus according to claim 10, wherein said binary-value/predetermined-value conversion circuit converts each of said serial signal and said signal which leads said serial signal by said predetermined bit into a predetermined-value signal in accordance with said plurality of time signals and said control signal supplied by said timing generator.

12. An apparatus according to claim 1, wherein said predetermined-value is an n-value, where n is an integer $\geq 3$.

13. An apparatus according to claim 12, wherein said predetermined-value is a quaternary-value, and said predetermined-value/binary-value conversion circuit is a quaternary-value/binary-value conversion circuit which converts a quaternary-value signal into a binary-value signal.

14. An apparatus according to claim 1, wherein said decoding means further includes a second predetermined-bit delay circuit for delaying a signal, output from said predetermined-value/binary-value conversion circuit, with a value of a predetermined-bit; and a second binary-value OR circuit which is capable of outputting said logical OR between a signal supplied from said predetermined-value/binary-value conversion circuit and said signal supplied from said second predetermined-bit delay circuit.

15. An apparatus for transmitting in a reduced-bit format without decreasing a transmission speed of a serial-signal and without omitting any information in said serial-signal, comprising:

encoding means for encoding said serial-signal with a binary-value into said serial-signal with a predetermined-value and for outputting an encoded serial-signal with said predetermined value, said encoding means including:

a first shift register for outputting said serial signal with said binary-value and a signal which leads said serial signal by a predetermined bit, a second shift register for outputting a serial signal with a binary-value, and a predetermined-bit delay circuit for delaying said serial signal with said binary-value output from said second shift register, and a binary-value/predetermined-value conversion circuit which converts said serial-signal with said binary-value, said signal which leads said serial signal by a predetermined bit output from said first shift register, said serial signal with said binary-value output from said second shift register, and an output signal which is output from said predetermined-bit delay circuit into said serial-signal with said predetermined-value; and decoding means for receiving said encoded serial-signal with said predetermined value output from said encoding means and for decoding a received serial-signal with said predetermined value into said serial-signal with said binary-value.

16. The apparatus of claim 15, wherein said second shift register is capable of providing said serial-signal to said binary-value/quaternary-value conversion circuit directly, without passing through said predetermined-bit delay circuit.

17. The apparatus of claim 15, wherein said encoding means further includes a timing generator for supplying a plurality of time signals and a control signal to said binary-value/predetermined value conversion circuit.

18. The apparatus of claim 17, wherein said binary-value/predetermined-value conversion circuit converts the signals input there to into said predetermined-value signal in accordance with said plurality of time signals and said control signal supplied by said timing generator.

19. An apparatus for transmitting in a reduced-bit format without decreasing a transmission speed of a serial-signal an without omitting any information in said serial-signal, comprising:

encoding means for encoding said serial-signal with a binary-value into said serial-signal with a predetermined-value and for outputting an encoded serial-signal with said predetermined value; and decoding means for receiving said encoding serial-signal with said predetermined value output from said encoding means and for decoding said received serial-signal with said predetermined value into said serial-signal with said binary-value, said decoding means including:

a predetermined-value/binary-value conversion circuit which converts said serial-signal with said predetermined-value into said serial-signal with said binary-value, and a first predetermined-bit delay circuit, for delaying a signal, output from said predetermined-value/binary-value conversion circuit, with a value of said predetermined-bit; and a first binary-value OR circuit which is capable of outputting a logical OR between a signal supplied from said predetermined-value/binary-value conversion circuit and a signal supplied from said first predetermined-bit delay circuit.

20. The apparatus of claim 19, wherein said decoding means further includes a second predetermined-bit delay circuit for delaying said signal with said value of said predetermined-bit, and a second binary-value OR circuit which is capable of outputting a logical OR between said signal supplied from said predetermined-value/binary-value conversion circuit and said signal supplied from said second predetermined-bit delay circuit.

21. The apparatus of claim 19, wherein said predetermined-value is an n-value, where n is an integer $\geq 3$.

22. The apparatus of claim 21, wherein said predetermined-value is a quaternary-value, and said predetermined-value/binary-value conversion circuit is a quaternary-value/binary-value conversion circuit which converts a quaternary-value signal into a binary-value signal.

* * * * *